United States Patent [19]
Heiba et al.

[11] 3,761,569

[45] Sept. 25, 1973

[54] METHOD OF REMOVING HYDROGEN SULFIDE FROM GASES

[75] Inventors: El-Ahmadi Ibrahim Heiba; Sundaresa Srinivasan, both of Princeton, N.J.

[73] Assignee: Mobil Oil Corporation, New York, N.Y.

[22] Filed: Jan. 28, 1971

[21] Appl. No.: 110,778

[52] U.S. Cl. ................................. 423/224, 423/573
[51] Int. Cl. .......................................... B01d 53/34
[58] Field of Search ..................... 23/2 R, 3 R, 181, 23/225 R, 225 P; 423/571, 573, 222, 224, 230, 242, 244, 569, 570, 574, 575, 576

[56] References Cited
UNITED STATES PATENTS

| | | | |
|---|---|---|---|
| 493,193 | 3/1893 | Stickney | 23/225 R |
| 2,765,217 | 10/1956 | Conroy, Jr. et al. | 23/225 P |

FOREIGN PATENTS OR APPLICATIONS

| | | | |
|---|---|---|---|
| 802,284 | 10/1958 | Great Britain | 23/3 R |

*Primary Examiner*—Earl C. Thomas
*Attorney*—Oswald G. Hayes, Andrew L. Gaboriault, R. W. Barclay and Stanley A. Strober

[57] ABSTRACT

A method for removing hydrogen sulfide from a gas stream involves passing the hydrogen sulfide-containing gas through a solution of cupric ions in a strong acid in the presence of oxygen.

9 Claims, No Drawings

METHOD OF REMOVING HYDROGEN SULFIDE FROM GASES

BACKGROUND OF THE INVENTION

1. Field of the Invention

This invention relates to a process for removing hydrogen sulfide from gases and more particularly it relates to a method for treating such gases with an acid-copper system.

2. Description of the Prior Art

It has been known to "sweeten" gas streams which contain mercaptans by means of copper compounds in the presence of oxygen to yield the corresponding disulfides. Copper sulfide is also produced and it separates out of the system. Hence, the copper must either be replaced or else regenerated by a separate process. Another procedure for removing hydrogen sulfide from gases involves treating the gas stream with vanadium compounds. However, that process requires the production in situ of hydrogen peroxide from oxygen and anthraquinone to convert the vanadium back to its higher oxidation level. This procedure, termed "Stretford Process," is described in Process News, November, 1968, Volume 13, No. 11.

SUMMARY OF THE INVENTION

We have now found that hydrogen sulfide may be removed from a gas stream by passing the gas stream through a solution of strong acid containing cupric ions in the presence of oxygen. Elemental sulfur is separated out as a precipitate, without significant loss of the copper through copper sulfide formation.

DESCRIPTION OF PREFERRED EMBODIMENTS

The acids used in this invention are the very strong mineral acids which include sulfuric acid, nitric acid, phosphoric acid, phosphorous acid, acetic and hydrochloric acid. Hydrochloric acid is the most preferred of the acids used in this invention. The pH of the acid-copper system should be very low, generally 1 to about 6, and preferably from 1 to about 4.

The use of the cupric ion in this invention is specific. We have found it effectively leads to the formation of sulfur in a conveniently removable form without itself being removed from the system as a sulfide. The resulting cuprous ion is continuously being regenerated to its higher oxidation level in situ for further operation. The copper compounds used in this invention to furnish cupric ions are preferably the corresponding salt of the mineral acid, such as cupric sulfate, cupric nitrate, cupric phosphate, cupric phosphite, cupric acetate, or cupric chloride; however, the salts and the acids may be mixed; and two or more different salts may be present. The concentration of the copper compound in acid on a molar basis may range from 0.05 to about 5 gram-moles of the salt per liter of acid solution and preferably from about 0.1 to about 1.

A second inorganic salt, preferably of lower molecular weight than the cupric salt, may be added to the acid solution if desired. The function of these salts is to elevate the normal boiling points of the mixture. Thus the elemental sulfur may be recovered in molten form from the top of the acid solution. These salts likewise lower the vapor pressure of the acids, thus reducing evaporation during the oxygenation or regeneration. These salts include alkali metal inorganic salts, preferably lithium and sodium salts.

The gas stream containing hydrogen sulfide may be passed through the solution separately from the oxygen stream or the oxygen may be combined with the gas stream to be treated. The supply of oxygen used in this invention may be provided by either pure oxygen, air, ozone or oxygen-enriched air. Although the volume ratio of $H_2S$ in the gas stream to the oxygen may vary, we prefer to use from 1:1 to about 1:300 volume to volume, and preferably from 1:1 to 1:50. Both gas streams may enter the acid-copper system simultaneously, or, if desired, the $H_2S$-containing gas stream may be introduced first, followed by the oxygen when analysis of the exit stream indicates the presence of hydrogen sulfide.

The temperature at which the gas treatment is carried out may range anywhere from below room temperature up to the boiling point of the acid used, preferably from room temperature to about 200°C. At the higher temperatures, when the said second salt is present, the sulfur forms at the top of the solution as a molten mass and can be removed by skimming. At the lower temperatures, the sulfur settles at the bottom of the treatment vessel and may be removed as a bottoms product.

For continuous operation, the solution temperature is preferably maintained at a higher level for convenient sulfur removal without loss of the acid solution. The gas stream exiting from the system from the vessel containing the acid copper system shows no detectable presence of hydrogen sulfide.

Any type of metal of construction for the reactor normally resistant to strong mineral acids at elevated temperatures can be used, including stainless steel, glass, ceramics, such as mineral acid resistant bricks, or plastics, such as polyvinyl chloride and epoxy resin linings.

The procedure of this invention is ideally adaptable to remove hydrogen sulfide even in very low concentrations from gases where air pollution problems are considerable, such as in refinery gases. In the past it has been found that while large amounts of hydrogen sulfide may be removed by conventional methods, such as adsorption, low concentrations are more difficult to deal with. The procedure of this invention effectively reduces even the smallest concentrations normally found in industrial gases as well as higher concentrations.

The following examples are intended to illustrate the invention but do not represent any limitations thereof.

EXAMPLE 1

To a suitable vessel of 40 mm diameter, equipped with a thermometer and inlet and exit tubes, are added 150 ml of concentrated hydrochloric acid and 4 grams (0.2 mole per liter) of cupric chloride. Air is bubbled into the vessel at the rate 100 ml per minute and hydrogen sulfide at the rate of 4 ml per minute through a sintered glass plate, the gases entering through different tubes. The exit gas is continuously analyzed with lead acetate paper and with vapor phase chromotography. No hydrogen sulfide is detected over a period of 30 minutes. This reaction is conducted at room temperature and bright yellow solid precipitate of sulfur was formed in this solution.

EXAMPLE 2

Using the same amounts of hydrochloric acid and cupric chloride as in Example 1, lithium chloride is added in an amount equivalent to that at which the boiling point of concentrated hydrochloric acid would be over 150°C. (This amount was determined by separate means). The temperature of the solution is raised to 120°C and into it are bubbled 22.4 ml per minute of hydrogen sulfide and 2,800 ml per minute of air through the same tube over a period of about 20 minutes. No detectable amount of hydrogen sulfide is found in the exit gas. The sulfur formed during the run is molten and remains at the top of the acid solution.

Having described the above invention, it is clear that this invention is susceptible to obvious modifications which are intended to be incorporated within the scope of our invention, which is defined in the following claims:

We claim:

1. A method for removing hydrogen sulfide from a gas stream comprising the step of passing the said gas stream through a solution of cupric salt dissolved in an acid selected from the group consisting of hydrochloric, nitric, phosphoric, acetic and phosphorous in the presence of oxygen.

2. The method of claim 1 wherein the cupric ions are provided by cupric chloride.

3. The method of claim 1 wherein the oxygen is in the form of a gas selected from the group consisting of oxygen, air, ozone and oxygen-enriched air.

4. The method of claim 3 wherein the oxygen is present as air.

5. The method of claim 1 wherein the cupric ions are present as a cupric salt at a concentration of from 0.05 to about 5 gram moles of salt per liter of acid solution.

6. The method of claim 1 wherein the volume ratio of $H_2S$ in the gas stream to oxygen is from about 1:1 to about 1:300.

7. The method of claim 1 wherein the pH of the said solution is in the range of from 1 to about 6.

8. The method of claim 1 wherein there is also present in the solution an alkali metal salt of the said acid.

9. The method of claim 1 wherein the gas stream containing hydrogen sulfide and a stream of air are passed through a solution of cupric chloride dissolved in hydrochloric acid.

* * * * *